(12) United States Patent
Fujimoto (10) Patent No.: US 7,524,556 B2
(45) Date of Patent: Apr. 28, 2009

(54) THERMOPLASTIC RESIN FOAMED ARTICLE

(75) Inventor: Takashi Fujimoto, Sodegaura (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/893,573

(22) Filed: Jul. 19, 2004

(65) Prior Publication Data
US 2005/0058824 A1 Mar. 17, 2005

(30) Foreign Application Priority Data
Jul. 23, 2003 (JP) .............................. 2003-200308
Aug. 12, 2003 (JP) .............................. 2003-207277

(51) Int. Cl.
*B32B 3/26* (2006.01)
*B32B 5/14* (2006.01)

(52) U.S. Cl. .............. 428/316.6; 428/318.8; 428/310.5; 428/319.3; 428/319.7; 428/318.6; 428/318.4

(58) Field of Classification Search .............. 428/316.6, 428/318.8, 310.5, 319.3, 319.7, 318.4, 318.6
See application file for complete search history.

(56) References Cited

U.S. PATENT DOCUMENTS 5,108,833 A * 4/1992 Noguchi et al. .......... 428/310.5
5,997,781 A * 12/1999 Nishikawa et al. ......... 264/45.1
6,368,701 B1 * 4/2002 Nomura et al. ............. 428/218
7,140,496 B2 * 11/2006 Nagoya et al. .............. 210/490
2004/0229030 A1 * 11/2004 Owensby ................. 428/316.6

FOREIGN PATENT DOCUMENTS

| JP | 06-057025 | 3/1994 |
|---|---|---|
| JP | 07-080885 | 3/1995 |
| JP | 8-108440 A | 4/1996 |
| JP | 10-235671 | 9/1998 |
| JP | 2001-287237 | 10/2001 |
| JP | 2003-041039 | 2/2002 |
| JP | P2002-234046 A | 8/2002 |

* cited by examiner

*Primary Examiner*—Hai Vo
(74) *Attorney, Agent, or Firm*—Fitch, Even, Tabin & Flannery (57) ABSTRACT

Disclosed is a thermoplastic resin foamed article, wherein the foamed article has two opposite surfaces, wherein the foamed article has at least a skin layer which defines one of the opposite surfaces and has a porosity of 0% or more but less than 1%, a lower-expansion layer which has a porosity of not less than 1% but less than 40% and is arranged so as to be adjacent to the skin layer, and a higher-expansion layer which has a porosity of not less than 40% but less than 100% and is arranged so as to be adjacent to the lower-expansion layer, wherein the skin layer, the lower-expansion layer and the higher-expansion layer are made of the same thermoplastic resin.

7 Claims, 3 Drawing Sheets

THERMOPLASTIC RESIN FOAMED ARTICLE

This U.S. application claims the priority benefits under 35 U.S.C. 119 of JP 2003-200308 and 2003-207277, filed Jul. 23, 2003 and Aug. 12, 2003, respectively, the complete disclosures of which are incorporated herein by reference.

BACKGROUND OF THE INVENTION

1. Field of the Invention

The present invention relates to a thermoplastic foamed article.

2. Description of the Related Art

Heretofore, automotive parts, household electrical appliance parts and other industrial parts have been strongly requested to have light weight but is superior in rigidity. As a material for forming such parts meeting those requests, thermoplastic foamed articles are known.

As an example of the thermoplastic foamed articles, JP-A-2002-234046 discloses a product comprising two layers including a skin layer and a foamed core layer. However, it still has plenty of room for improvement in rigidity.

JP-A-8-108440 discloses a foam board in which cells have a ratio of their size in the thickness direction to their size in a direction perpendicular to the thickness direction is from 2.5 to 10. However, although it is superior in cushion property and shock absorption, there is a problem with it in that it has insufficient rigidity.

SUMMARY OF THE INVENTION

One object of the present invention is to provide a thermoplastic resin foamed article superior in rigidity.

A more specified object of the present invention is to provide a thermoplastic resin foamed article which is superior in rigidity and also is excellent in cushion property and shock absorption.

The present invention provides a thermoplastic resin foamed article, wherein the foamed article has two opposite surfaces, wherein the foamed article has at least a skin layer which defines one of the opposite surfaces and has a porosity of 0% or more but less than 1%, a lower-expansion layer which has a porosity of not less than 1% but less than 40% and is arranged so as to be adjacent to the skin layer, and a higher-expansion layer which has a porosity of not less than 40% but less than 100% and is arranged so as to be adjacent to the lower-expansion layer, wherein the skin layer, the lower-expansion layer and the higher-expansion layer are made of the same thermoplastic resin.

One preferred embodiment of the present invention is a foamed article wherein the higher-expansion layer has therein cells which have a ratio of D1 to D2, D1/D2, of from 1 to 4 wherein D1 denotes the length of the cells in the thickness direction of the higher-expansion layer and D2 denotes the length of the cells in a direction perpendicular to the thickness direction.

Another preferred embodiment of the present invention is a foamed article wherein the higher-expansion layer has therein cells, wherein cells located in a portion in the higher-expansion layer near the lower-expansion layer have a ratio of Da1 to Da2, Da1/Da2, of from 1 to 4 where Da1 denotes the length of the cells in the thickness direction of the higher-expansion layer and Da2 denotes the length of the cells in a direction perpendicular to the thickness direction, and wherein cells located in a central portion in the higher-expansion layer have a ratio of Db1 to Db2, Db1/Db2, of more than 4 but not more than 10, where Db1 denotes the length of the cells in the thickness direction of the higher-expansion layer and Db2 denotes the length of the cells in a direction perpendicular to the thickness direction.

BRIEF DESCRIPTION OF THE DRAWINGS

In the drawings, each of the reference numerals has a meaning shown below.

1: skin layer, 2: lower-expansion layer, 3: higher-expansion layer, 4: cells of lower-expansion layer, 5: cells of higher-expansion layer, 5a: cells located in higher-expansion layer near a lower-expansion layer, 5b: cells located near a central portion in higher-expansion layer, and 11: gate.

DESCRIPTION OF THE PREFERRED EMBODIMENTS

In the present invention, the thermoplastic resin foamed article refers to a thermoplastic resin article having cells inside. In the following description, a "thermoplastic resin foamed article" is referred simply to as a "foamed article".

Figure 1:
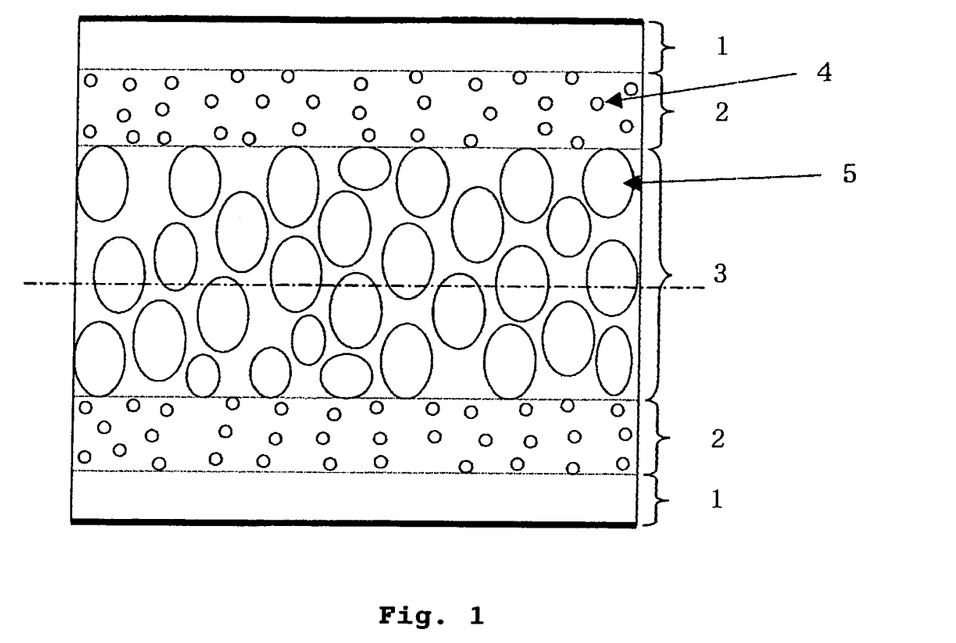
FIG. 1 is a schematic enlarged sectional view along the thickness direction of a thermoplastic resin foamed article of the present invention.

As shown in FIG. 1, the foamed article of the present invention has two opposite surfaces and the foamed article has at least a skin layer which defines one of the opposite surfaces and has a porosity of 0% or more but less than 1%, a lower-expansion layer which has a porosity of not less than 1% but less than 40% and is arranged so as to be adjacent to the skin layer, and a higher-expansion layer which has a porosity of not less than 40% but less than 100% and is arranged so as to be adjacent to the lower-expansion layer, wherein the skin layer, the lower-expansion layer and the higher-expansion layer are made of the same thermoplastic resin.

Figure 3:
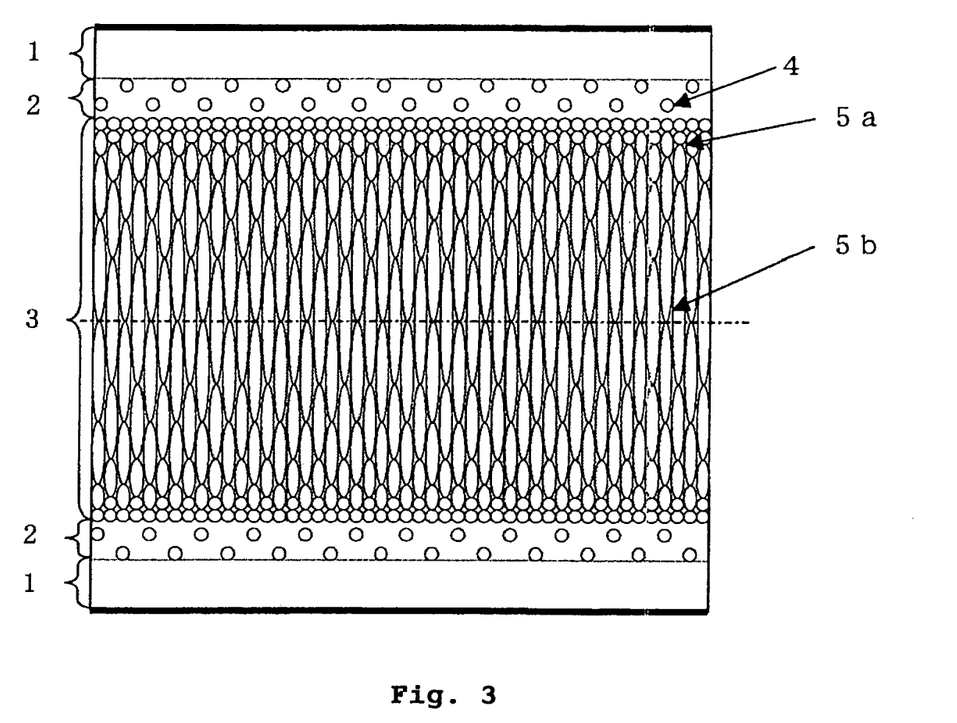
FIG. 3 is a schematic enlarged sectional view along the thickness direction of a thermoplastic resin foamed article of the present invention.

Moreover, in one preferred embodiment, as shown in FIG. 3, there is a specific cell size distribution in the higher-expansion layer in the foamed article of the present invention.

If, instead the combination of the skin layer (1) and the lower-expansion layer (2), only a skin layer having a thickness corresponding to the combined thickness of the skin layer (1) and the lower-expansion layer (2) is present, the light weight property, the cushion property and the shock absorption will become insufficient. On the other hand, if, instead the combination of the lower-expansion layer (2) and the higher-expansion layer (3), only a higher-expansion layer having a thickness corresponding to the combined thickness of the lower-expansion layer (2) and the higher-expansion layer (3) is present, the rigidity of the foamed article will decrease. The higher the porosity of the higher-expansion layer (3), the better for the purposes of reducing the weight and improving the rigidity, the cushion property and the shock absorption. However, in order to avoid an extreme reduction in strength, the porosity is preferably 98% or less.

The foamed article of the present invention must have at least one skin layer (1), at least one lower-expansion layer (2) and at least one higher-expansion layer (3). However, it is desirable that two skin layers (1), two lower-expansion layers (2) and one higher-expansion layer (3) are formed in an arrangement: skin layer (1)/lower-expansion layer (2)/higher-expansion layer (3)/lower-expansion layer (2)/skin layer (1).

The measurement of the porosity is carried out based on a photograph, magnified by a scanning electron microscope (SEM), of a cross section of the foamed article. For a cut sample, proportions of areas occupied by cells found in a lower-expansion layer (2) and cells in a higher-expansion layer (3) in a cross section along the thickness direction of the foamed article are determined by image analysis. Based on the results, the porosity of the lower-expansion layer (2) and that of the higher-expansion layer (3) can be calculated.

The cells may be either closed cells or open cells. Closed cells are advantageous with respect to the shock absorption against a strong shock, whereas open cells are advantageous with respect to the cushion property and the shock absorption against a weak shock.

The shape and size of cells are not particularly restricted, but the lower-expansion layer (2) desirably has an average cell size of 100 µm or less and the higher-expansion layer (3) desirably has an average cell size of from 30 µm to 3000 µm.

The cell size is measured based on a photograph, magnified by a scanning electron microscope (SEM), of a cross section of the foamed article. For a cut sample, a minimum size and a maximum size of cells (4) and (5) found in a lower-expansion layer (2) and a higher-expansion layer (3) in the cross section along the thickness direction of the foamed article are measured. The average of the measurements is used as the cell size.

The expansion ratio of the foamed article is defined as a value obtained by dividing the specific gravity of the material constituting the foamed article in an unfoamed state by the specific gravity of the foamed article and is preferably 1.25 or more, more preferably 1.5 or more, and still more preferably 3 or more. When great importance is attached to the cushion property and the shock absorption, the foamed article desirably has an expansion ratio of 4 or more.

The thicknesses of the skin layer (1), the lower-expansion layer (2) and the higher-expansion layer are not particularly restricted and may be determined appropriately depending on the application, usage purpose and required performance of the foamed article. For a foamed article which is light in weight but high in rigidity, it is desirable that the skin layer (1) have a thickness ranging from 0.05 to 0.7 mm, that the lower-expansion layer (2) have a thickness ranging from 0.05 to 0.7 mm, and that the higher-expansion layer (3) have a thickness ranging from 0.1 to 50 mm. When great importance is attached to the cushion property and the shock absorption, it is desirable that the skin layer (1) have a thickness ranging from 0.05 to 0.7 mm, that the lower-expansion layer (2) have a thickness ranging from 0.05 to 0.7 mm, and that the higher-expansion layer (3) have a thickness ranging from 3 to 80 mm.

The foamed article of the present invention is not required that the whole foamed article be constituted of the aforementioned three types of layers, namely the skin layer, the lower-expansion layer and the higher-expansion layer. It is only required that a desired portion in a foamed article be constituted of the three types of layers, namely the skin layer, the lower-expansion layer and the higher-expansion layer.

Figure 2:
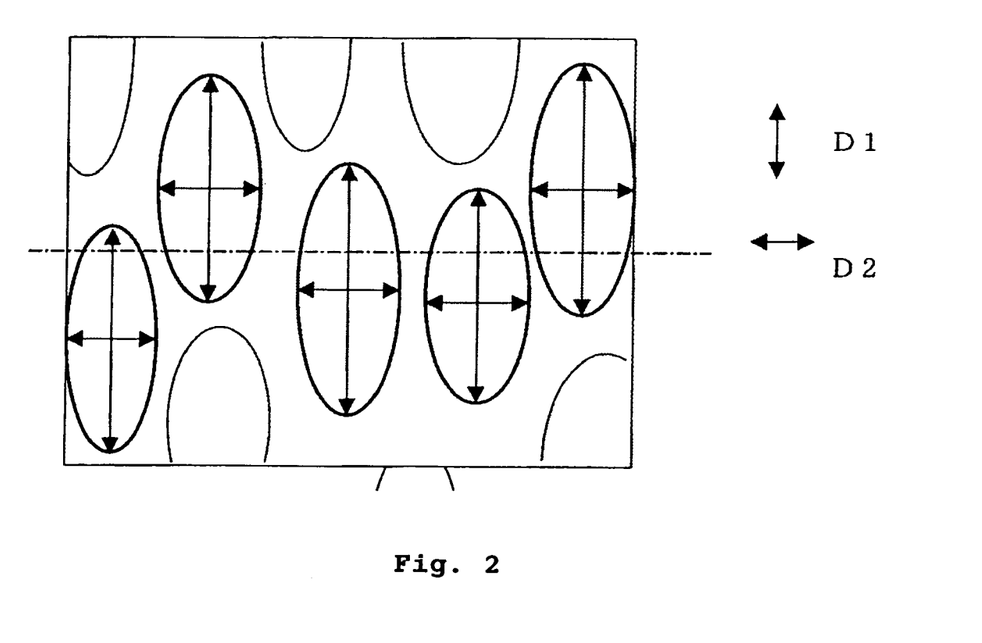
FIG. 2 is a schematic enlarged sectional view of a portion near the center of a higher-expansion layer of a thermoplastic resin foamed article of the present invention.

In one embodiment of the present invention, it is desirable that, as shown in FIG. 2, cells in the higher-expansion layer have a ratio of D1 to D2, D1/D2, of from 1 to 4 wherein D1 denotes the length of the cells in the thickness direction of the higher-expansion layer and D2 denotes the length of the cells in a direction perpendicular to the thickness direction.

If the value of D1/D2 is smaller than 1, the foamed article has tendencies to exhibit a reduced resistance against bending deformation and to exhibit a reduced resilience against compressive deformation.

If the value of D1/D2 is larger than 4, the foamed article has a tendency to have a reduced rigidity to buckle from bending deformation.

D1 and D2 are determined using a photograph, magnified by a scanning electron microscope (SEM), of a central portion of the higher-expansion layer with respect to its thickness direction in a cross section of the foamed article, as shown in FIG. 2. For at least ten cells chosen at random from the cells located in the central portion of the higher-expansion layer, each cell is measured for a maximum size in the thickness direction and a maximum size in a direction perpendicular to the thickness direction. The average of the measurements in the thickness direction of the chosen cells and the average of the measurements in the direction perpendicular to the thickness direction of the chosen cells are used as D1 and D2, respectively.

In a foamed article shown in FIG. 3, if cells (5a) located in a portion of the higher-expansion layer near the lower-expansion layer has a value of Da1/Da2 smaller than 1, the foamed article has tendencies to exhibit a reduced resistance against bending deformation and to exhibit a reduced resilience against compressive deformation. On the other hand, if the value of Da1/Da2 is larger than 4, the foamed article has a tendency to have a reduced rigidity to buckle from bending deformation. By the "portion of the higher-expansion layer near the lower-expansion layer" is meant a "region of the higher-expansion layer extending within 10% of the thickness of the higher-expansion layer from the boundary between the lower-expansion layer and the higher-expansion layer".

In order for the foamed article to have an excellent cushion property, an excellent shock absorption and an excellent resistance against compressive deformation simultaneously, it is desirable that cells (5b) in the central portion of the higher-expansion layer have a Db1/Db2 ratio of more than 4 but not more than 10.

If the cells (5b) in the central portion of the higher-expansion layer have a Db1/Db2 ratio of 4 or less, the foamed article has a tendency to deteriorate with respect to the cushion property and the shock absorption. On the other hand, if the value of Db1/Db2 is larger than 10, the foamed article has a tendency to readily suffer compressive deformation from an external force.

Da1 and Da2 are determined using a photograph, magnified by a scanning electron microscope (SEM), of a section of the foamed article. Using the magnified photograph, each cell contained in a region sized 0.5 mm by 0.5 mm adjacent to the lower-expansion layer is measured for a maximum size in the thickness direction and a maximum size in a direction perpendicular to the thickness direction. The average of the measurements in the thickness direction of the chosen cells and the average of the measurements in the direction perpendicular to the thickness direction of the chosen cells are used as Da1 and Da2, respectively.

Figure 4:
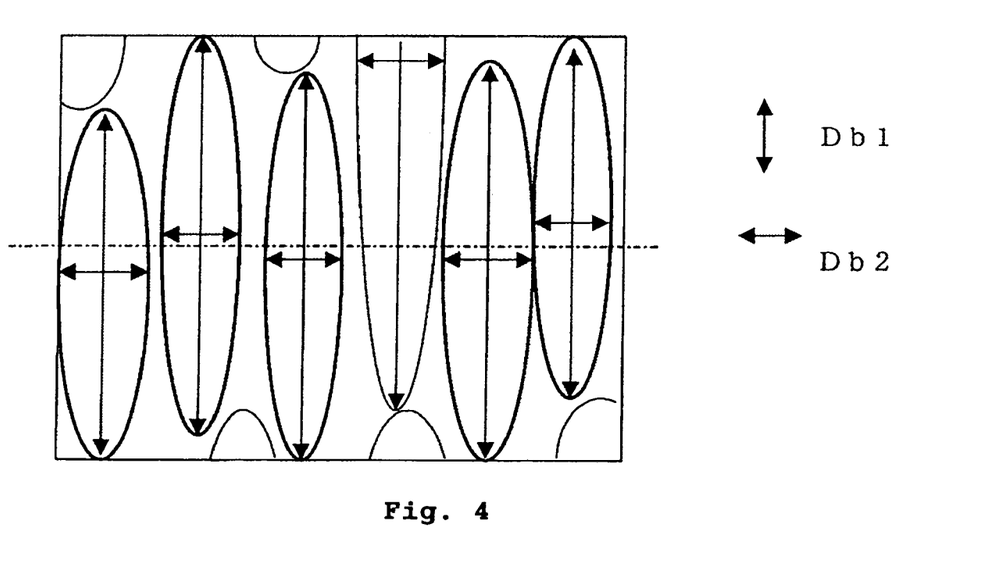
FIG. 4 is a schematic enlarged sectional view of a portion near the center of a higher-expansion layer of a thermoplastic resin foamed article of the present invention.
Figure 5:
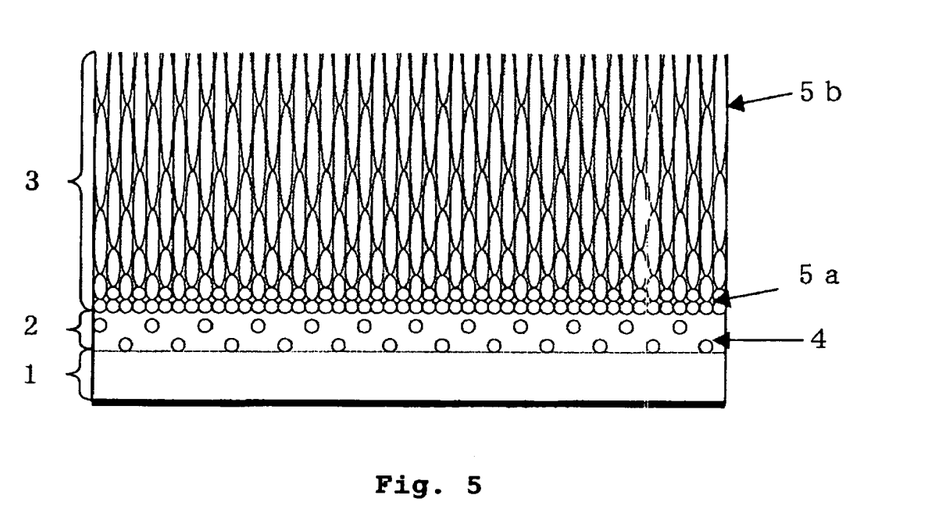
FIG. 5 is a schematic enlarged sectional view of a thermoplastic resin foamed article of the present invention, the article having a surface defined by a higher-expansion layer.
Figure 6:
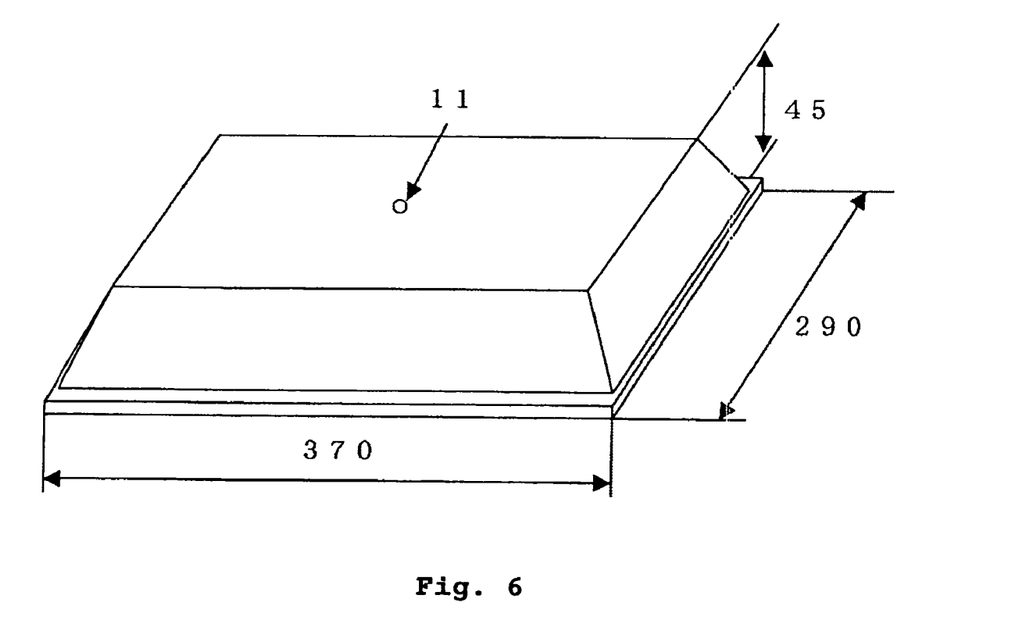
FIG. 6 is an outside view of a thermoplastic resin foamed article produced in the working examples.

Db1 and Db2 are determined using a photograph of a central portion in the higher-expansion layer with respect to its thickness direction in a section of the foamed article, as shown in FIG. 4, magnified by a scanning electron microscope (SEM). For at least ten cells chosen at random from the cells located in the central portion in the higher-expansion layer, each cell is measured for a maximum size in the thickness direction and a maximum size in a direction perpendicular to the thickness direction. The average of the measurements in the thickness direction of the chosen cells and the average of the measurements in the direction perpendicular to the thickness direction of the chosen cells are used as Db1 and Db2, respectively.

The absolute thickness of the portion in the higher-expansion layer (3) which portion is located near the lower-expansion layer and contains cells having a Da1/Da2 ratio of from 1 to 4 is not particularly restricted and maybe determined appropriately depending on the application, usage purpose and required performance of the foamed article. In order to achieve good cushion property and good shock absorption, the thickness of the portion containing cells having a Da1/Da2 ratio of from 1 to 4 is preferably within the range of 0.3 mm to 10 mm.

The thermoplastic resin for use in the present invention is not particularly restricted and various types of thermoplastic resin may be employed. Examples of the thermoplastic resin include olefin-based resin, styrene-based resin, acrylic resin, amide resin, olefin-based thermoplastic elastomer and styrene-based thermoplastic elastomer. Among these thermoplastic resins, olefin-based resin and olefin-based thermoplastic elastomer are preferably employed.

In the present invention, the olefin-base resin includes resins having olefin-derived repeating units in an amount of 50% by weight or more. It includes homopolymers of $\alpha$-olefins having 20 or less carbon atoms, e.g. ethylene, propylene, butene-1, pentene-1, hexene-1,3-methylbutene-1 and 4-methylpentene-1; copolymers obtained by copolymerization of at least two kinds of monomers selected from the aforementioned $\alpha$-olefins; and copolymers of those $\alpha$-olefins and other unsaturated monomers copolymerizable with those $\alpha$-olefins.

Examples of the unsaturated monomers copolymerizable with $\alpha$-olefins include unsaturated carboxylic acid such as acrylic acid and methacrylic acid; derivatives of alkyl esters of unsaturated carboxylic acids, e.g. methyl (meth)acrylate, 2-ethylhexyl acrylate, ethyl(meth)acrylate and butyl (meth) acrylate; unsaturated dicarboxylic acids or their anhydrides, e.g. fumaric acid, maleic acid, maleic anhydride and itaconic acid; derivatives of unsaturated carboxylic acids or unsaturated dicarboxylic acids, e.g. acrylamide, N-(hydroxymethyl) acrylamide, glycidyl(meth)acrylate, acrylonitrile, methacrylonitrile, mono- or diethyl ester of maleic acid, N-phenylmaleimide and N,N'-metaphenylene bismaleimide.

As the olefin-based resin to be used in the present invention, polypropylene resin is preferred. Examples of the polypropylene resin include homopolymers of propylene and copolymers of propylene with at least one kind of monomer selected from the group consisting of ethylene and $\alpha$-olefins having 4 to 12 carbon atoms. These homopolymers and copolymers may be used alone or in combination. Examples of the $\alpha$-olefins having 4 to 12 carbon atoms include 1-butene, 4-methyl-1-pentene, 1-hexene and 1-octene. The copolymers of propylene with at least one kind of monomer selected from ethylene and $\alpha$-olefins having 4 to 12 carbon atoms desirably are copolymers containing at least 50% by weight of repeating units derived from propylene, which may henceforth be referred to as "propylene units," based on 100% by weight of the copolymers.

The flexibility and impact resistance of the copolymers can be controlled by choosing the amount of repeating units derived from ethylene or $\alpha$-olefins having from 4 to 12 carbon atoms.

If a copolymer has two or more kinds of repeating units other than propylene units, the total amounts of the repeating units other than propylene units is preferably not more than 35% by weight.

Specific examples of the polypropylene resin include (i) homopolymers of propylene, (ii) random copolymers of propylene and ethylene, (iii) random copolymers of propylene and $\alpha$-olefin, (iv) random copolymers of propylene, ethylene and $\alpha$-olefin, and (v) block copolymers propylene and ethylene.

The polypropylene resin preferably has a melt flow rate (MFR), measured in accordance with JIS k 6758, of from 1 to 100 g/10 min. From the viewpoint of molding processability, it is more preferably 5 g/min or more, and still more preferably 8 g/10 min.

Polypropylene resins which are particularly preferred in the present invention preferably contain a polymer in which an ultra high molecular weight component is introduced, the polymer being prepared by producing, in a first stage, a polypropylene polymer (I) having an intrinsic viscosity of 5 dl/g or more, which is an ultra high molecular weight component, by polymerizing monomers composed mainly of propylene and then continuously producing, in a second or later stage, a polypropylene polymer (II) having an intrinsic viscosity less than 3 dl/g by polymerizing monomers composed mainly of propylene; or a polypropylene polymer ordinarily having a branching structure where a polypropylene resin has long-chain branches mainly at its ends, the polymer being obtained by a method described in JP-A-62-121740 comprising introducing long-chain branches through crosslinking using low-level radiation, a method comprising reacting a polypropylene polymer, a radically-polymerizable monomers and a radical initiator together, a method comprising mixing a polypropylene resin and a radical initiator together under a temperature condition where breakage of primary chains of the resin does not occur preferentially.

In addition, a resin other than olefin-based resin may be added to the olefin-based resin unless the object of the present invention is disturbed. Examples of the resin other than olefin-based resin include styrene-based resin, acrylic resin, amide resin and styrene-based elastomer such as hydrogenation products of styrene-butadiene diblock copolymers, hydrogenation products of styrene-butadiene-styrene triblock copolymers and hydrogenation products of styrene-isoprene-styrene triblock copolymers, and mixtures thereof. These may be added appropriately depending on application.

The olefin-based thermoplastic elastomer refers to a combination of an olefin copolymer rubber and an olefin polymer in any desired weight ratio. The olefin copolymer rubber may be present in an uncrosslinked, partially crosslinked or completely crosslinked state in the thermoplastic elastomer. Preferably used is a crosslinked olefin-based thermoplastic elastomer in which an olefin copolymer rubber is present in a partially or completely crosslinked state.

The olefin copolymer rubber is an amorphous random elastic copolymer composed mainly of olefin. Examples thereof include ethylene-propylene copolymer rubber, ethylene-$\alpha$-olefin copolymer rubber, ethylene-propylene-$\alpha$-olefin copolymer rubber, ethylene-propylene-nonconjugated diene copolymer rubber, ethylene-butene-1-nonconjugated diene copolymer rubber, and propylene-butene-1 copolymer rubber. Of these rubbers, ethylene-propylene-nonconjugated diene copolymer rubber and ethylene-propylene copolymer rubber are preferred. Examples of the nonconjugated diene include dicyclopentadiene, 1,4-hexadiene, cyclooctadiene, methylene norbornen and ethylidene norbornene. In particular, ethylidene norbornene is preferred. As the olefin copolymer rubber, particularly preferred is an ethylene-propylene-ethylidene norbornene copolymer rubber having a propylene unit content of from 10 to 55% by weight, preferably from 20 to 40% by weight, and an ethylidene norbornene unit content of from 1 to 30% by weight, preferably from 3 to 20% by weight.

The olefin copolymer rubber can be produced by known methods. Examples of the catalyst to be used include Ziegler-Natta catalysts and metallocene-type homogeneous catalysts.

The olefin-based copolymer is a polymer composed mainly (preferably 50% by weight or more) of olefin. Examples thereof include propylene homopolymers and propylene-α-olefin copolymer. These may be used alone or in combination. Examples of the α-olefin include ethylene, 1-butene, 1-pentene, 3-methyl-1-butene, 1-hexene, 1-decene, 3-methyl-1-pentene, 4-methyl-1-pentene and 1-octene.

In the present invention, the above-mentioned thermoplastic resin may be used alone or two or more kinds of resins may be used in combination depending on the purpose. For example, use of a hard resin such as olefin-based resin will result in a foamed article which is lighter and superior in rigidity in comparison to conventional injection molded articles or conventional foamed articles. On the other hand, use of a soft resin such as olefin-based thermoplastic elastomer will result in a foamed article which is lighter and is well-balanced with respect to rigidity and soft feeling in comparison to conventional injection molded articles or conventional foamed articles.

When an olefin-based resin and an olefin-based thermoplastic elastomer are used in combination in any desired ratio, a foamed article can be obtained which is balanced with respect to rigidity and soft feeling depending on the purpose.

The thermoplastic resin used in the present invention may contain inorganic filler such as talc, mica, clay, calcium carbonate, aluminium hydroxide, magnesium hydroxide, wollastonite, bariumsulfate, glass fiber, carbon fiber, silica, calcium silicate, potassium titanate and wollastonite.

Moreover, the thermoplastic resin used in the present invention may contain various kinds of additives. Examples of such additives include antioxidants such as phenol-type antioxidant, organic phosphite-type antioxidant, organic phosphorus-type antioxidants; heat stabilizers such as hindered amine-type heat stabilizers; UV absorbers such as benzophenone-type UV absorbers, benzotriazole type UV absorbers and benzoate type UV absorbers; antistatic agents such as nonionic antistatic agents, cationic antistatic agents and anionic antistatic agents; dispersing agents such as bisamide-type dispersing agents, wax-type dispersing agents and organometal salt-type dispersing agents; chlorine scavengers; lubricants such as amide-type lubricants, wax-type lubricants, organometal salt-type lubricants and ester-type lubricants; decomposers such as oxide-type decomposers and hydrotalcite-type decomposers; metal deactivators such as hydrazine-type metal deactivators and amine-type metal deactivators; flame retardants such as bromine-containing organic flame retardants, phosphoric acid-type flame retardants, antimony trioxide, magnesium hydroxide and red phosphorus; organic pigments; inorganic pigments; organic filler; inorganic or organic antibacterial agents such as metal ion-type antibacterial agents; and nucleating agents such as organophosphoric acid nucleating agents and sorbitol compounds.

As a method for producing the foamed article of the present invention, known methods such as injection expansion molding, press expansion molding, extrusion expansion molding and stamping expansion molding. The foamed article is preferably produced by injection expansion molding.

In the injection expansion molding, a thermoplastic resin containing a foaming agent is charged into a mold cavity of an injection molding machine, and then the volume of the mold cavity is maintained for a while. Thus, a skin layer and a lower-expansion layer having a porosity of not less than 1% but less than 40% are formed. After that, at least a part of the mold cavity is enlarged. Through this operation, the resin located in the central portion with respect to the thickness direction of the cavity is further expanded to have a porosity of not less than 40%. Thus, a higher-expansion layer is formed. Subsequently, the foamed resin is cooled to solidify. The foamed article obtained in this way is used for various applications because it has a favorable foam structure containing no coarse cells.

Examples of the method for forming a lower-expansion layer having a porosity of not less than 1% but less than 40% include a first method which comprises packing a foaming agent-containing resin fully into a mold cavity, allowing the resin to expand by a volume corresponding to its shrinkage from its cooling by utilizing expansion of the gas of the foaming agent, thereby filling the whole mold cavity with the expanded resin; a second method comprising injecting a foaming agent-containing resin of a volume smaller than the capacity of a mold cavity into the mold cavity, and allowing the resin to expand by utilizing expansion of the gas of the foaming agent, thereby filling the whole mold cavity with the expanded resin; and a third method comprising injecting a foaming agent-containing resin into a mold cavity to fully packing it, enlarging at least a part of the mold cavity so as to allow the resin to have a porosity of not less than 1% but less than 40%, thereby allowing the resin to expand utilizing expansion of the gas of the foaming agent, and there by filling the whole mold cavity with the expanded resin. The first method is preferred.

Examples of concrete methods for forming a higher-expansion layer by enlarging at least a part of the mold cavity to allow the resin located in the central portion with respect to the thickness direction of the cavity, thereby further expanding the resin to have a porosity of not less than 40% include: a method comprising enlarging the whole cavity by retracting the mold cavity surface, a method comprising partly and/or entirely enlarging the cavity using a slide core, and a method comprising a combination of the above methods.

The expansion molding may be carried out in combination with any method such as gas assist molding, melt core molding, insert molding and two-color molding.

The shape of the foamed article is not particularly restricted.

The foaming agent for use in the present invention is not particularly restricted and conventional foaming agents including chemical foaming agents and physical foaming agents may be employed.

The chemical foaming agent may be any substance which does not decompose at temperatures lower than the melting temperature of the thermoplastic resin but decomposes or reacts at temperatures not lower than the molting temperature of the thermoplastic resin. The chemical foaming agent may be either a min organic compound or an organic compound. Two or more agents may be used in combination.

Examples of the inorganic compound include hydrogencarbonates such as sodium hydrogencarbonate, and ammonium carbonate.

Examples of the organic compound include polycarboxylic acids, azo compounds, sulfone hydrazide compounds, nitroso compounds, p-toluenesulfonyl semicarbazide and isocyanate compounds.

The polycarboxylic acids include citric acid, oxalic acid, fumaric acid and phthalic acid.

The azo compounds include azodicarbonamide (ADCA).

The sulfone hydrazide compounds include p-methylurethane benzenesulfonylhydrazide, 2,4-toluenedisulfonylhydrazideand 4,4'-oxybisbenzenesulfonyl hydrazide.

The nitroso compounds include dinitrosopentamethylene tetramine (DPT).

Examples of the physical foaming agents include inert gas such as nitrogen and carbon dioxide, and volatile organic compounds other than freon-type organic compounds, such as butane and pentane. Two or more physical foaming agents may be used in combination. Moreover, a chemical foaming agent and a physical foaming agent may be employed in combination.

The foaming agent to be used in the present invention preferably is inert gas. The inert gas preferably is a min organic substance which exhibits no reactivity to the resin to be employed and has no probability of degrading the resin and which is in a gaseous form under ambient temperature and pressure conditions. Examples of inert gas include carbon dioxide, nitrogen, argon, neon, helium and oxygen. These may be used either alone or in combination. Among them, carbon dioxide, nitrogen and a mixture thereof are preferably employed because they are inexpensive and are of high safety.

Use of supercritical inert gas as a foaming agent is preferred because it exhibits a high solubility to resin and can be diffused evenly in the resin within a short time and therefore it has an effect of increasing the number of cells to be formed to yield a foamed article having a good foamed cell structure. Moreover, because the supercritical inert gas as a foaming agent can generate a high foaming pressure, the whole mold cavity can be filled with an expanded resin at a time just after the completion of injection of the foaming-agent containing resin into the mold cavity. It, therefore, is preferably employed for the method which comprises allowing a resin to expand by the a volume corresponding to the shrinkage of the resin from its cooling, by utilizing expansion of the gas of the foaming agent.

As a method for mixing thermoplastic resin and inert gas, a method in which an inert gas in a supercritical state as a foaming agent is charged into a cylinder of an injection molding machine and then a molten resin and the inert gas are mixed, dispersed and dissolved is preferred because a foamed article is foamed evenly overall and a molding cycle can be shortened. As a supercritical inert gas, supercritical nitrogen, supercritical carbon dioxide and a supercritical mixture of nitrogen and carbon dioxide are preferably employed.

The foamed article of the present invention can be integrated in layer with a substrate by injection molding, injection compression molding, adhering or the like to form a laminate.

The foamed article in the laminate has a covering material on its surface on which the substrate is not present.

Moreover, the foamed article of the present invention may be combined with a covering material to form a decorated foamed article.

As such a covering material, known covering materials may be employed. Specific examples of covering materials include woven fabric, nonwoven fabric, knitted fabric, films and sheets made of thermoplastic resin or thermoplastic elastomer. Moreover, also available are composite covering materials in which nonfoamed sheets of polyurethane, rubber, thermoplastic elastomer or the like are integrally laminated with those covering materials.

The covering materials may be provided with a cushion layer. The material for constituting such a cushion layer may include polyurethane foam, EVA foam, polypropylene foam and polyethylene foam.

Moreover, it is also possible to provide a covering material with a backing layer which serves as a protection layer. Examples of the backing layer include woven fabric, nonwoven fabric, knitted fabric, films and sheets made of thermoplastic resin or thermoplastic elastomer The covering material to be applied for the present invention preferably has air permeability. Examples thereof include woven fabric, knitted fabric, nonwoven fabric similar to those previously mentioned and materials prepared from sheets or films of thermoplastic resin or thermoplastic elastomer by making pores in the sheets or films to impart air permeability to them. When the covering material has a multilayer structure, not all the layers constituting the covering material are required to have air permeability. It is only required that at least the layer which is to be laminated to a foamed article of the present invention have air permeability.

The foamed article of the present invention may be used in a conventional molding method to form a laminate having a substrate combined with the foamed article. Examples of conventional molding methods include insert molding and two-color molding.

In the insert molding, a foamed article of the present invention is produced in advance and then is placed in a cavity of a mold for injection molding. After that, a thermoplastic resin for forming a substrate is injection molded. Thus, a laminate in which the foamed article is firmly bonded to the substrate is obtained.

In addition, a laminate in which a foamed article is firmly bonded to a substrate can also be obtained by molding a thermoplastic resin to form a substrate, placing the substrate in a mold cavity, and then expansion molding a foamed article of the present invention in the mold cavity.

In the two-color molding, a thermoplastic resin for forming a substrate is injected, and then a foamed article of the present invention is expansion molded. Thus, a laminate in which a substrate made of the thermoplastic resin is bonded firmly to the foamed article of the present invention is obtained As a thermoplastic resin for forming a substrate, various kinds of resin may be used. Particularly, propylene-based resin is preferably employed. Examples of the propylene-based resin include propylene homopolymer, propylene-α-olefin random copolymer and propylene-ethylene block copolymer. These may be used alone or in combination. Moreover, materials resulting from mixing thermoplastic elastomer, rubber or various types of inorganic filler with propylene-based resin are also preferred.

When insert molding is carried out using a laminate prepared by expansion molding a foamed article while placing a covering material in a mold cavity, anew laminate can be obtained which has a structure: covering material/foamed article/substrate. Alternatively, a laminate having a structure of covering material/foamed article/substrate can be obtained also by a method in which a covering material and a substrate are placed in a mold cavity in advance and then a foamed article of the present invention is expansion molded between the covering material and the substrate.

In the present invention, it is desirable that the foamed article or laminate have a surface defined by a higher-expansion layer because not only cushion property and shock absorption but also sound absorption property of the foamed article or laminate are improved.

The method for producing the foamed article or laminate having a higher-expansion surface is not particularly restricted if the product has the specific foam structure of the present invention. One example is a method in which a foamed article or laminate obtained by the aforementioned injection expansion molding or the like is cut in the higher-expansion layer.

The foamed article of the present invention has at least three kinds of layers, namely a skin layer, a lower-expansion layer and a higher-expansion layer. It, therefore, is light in weight and also is superior in rigidity. Particularly, a foamed article whose higher-expansion layer has the aforementioned special foam structure is excellent in cushion property and shock absorption and is also superior in rigidity. Therefore, such foamed articles can be used suitably for various applications such as automotive parts, household electrical appliance parts and other industrial parts.

EXAMPLES

The present invention will be described more concretely below by reference to examples. However, the invention is not limited to these examples.

[Evaluation Method]

Melt Flow Rate (MFR)

The melt flow rate was determined, according to JIS K 7210, under conditions including a temperature of 230° C. and a load of 2.16 kgf for resins composed mainly of repeating units derived from propylene.

Total Expansion Ratio

The total expansion ratio of a foamed article was indicated by a value obtained by dividing a specific gravity of the foamed article measured using a hydrometer (an electronic hydrometer EW-200SG available from Mirage Trading Co., Ltd.) by a specific gravity of an unfoamed material.

Thickness and Porosity of Skin Layer, Low-Expansion Layer and High-Expansion Layer A foamed article was cut. The formed cross section was observed by a scanning electron microscope and the condition of cells were judged. Moreover, the thickness measurement was conducted for a skin layer, a lower-expansion layer and a higher-expansion layer. The porosities of the lower-expansion layer and the higher-expansion layer were determined through image analysis of the layers using image processing software available from Nano System Corp. "Nona Hunter NS 2K-Pro".

Rigidity

A test piece sized 50 mm by 150 mm was cut from a foamed article and was held at its both ends at a span of 100 mm. To the center of the test piece, a load was applied so that the test piece deflects at a rate of 50 mm/min. Thus, a load-deflection curve was produced. Using a slope of the initial straight part of the curve, a load (N/cm) required for generating 1 cm deflection was calculated and it was used as a measure of the rigidity of the foamed article.

D1/D2, Da1/Da2 and Db1/Db2

A foamed article was cut and a section was observed by a scanning electron microscope. From a magnified photograph of a higher-expansion layer, D1, D2, Da1, Da2, Db1 and Db2 was determined and then D1/D2, Da1/Da2 and Db1/Db2 were calculated.

Cushion Property

A foamed article was pushed with a finger. The cushion property was examined by the touch feeling.

Example 1

As a thermoplastic resin, polypropylene AZ161C (manufactured by Sumitomo Mitsui Polyolefin Co., Ltd., MFR 30 g/10 min) was used. Expansion molding was carried out using an ES2550/400HL-MuCell (clamping force 400 ton) manufactured by ENGEL as an injection molding machine and a mold having a box-shaped molding section having dimensions of 290 mm by 370 mm, 45 mm in height and 2 mm in thickness (gate structure: bubble gate located in the central portion of a molded article) as shown in FIG. 2. As a foaming agent, supercritical nitrogen was used. It was supplied into the cylinder of the molding machine while being compressed to 20 MPa. The amount of the foaming agent supplied was 1.2%. A mixture of the thermoplastic resin and a foaming agent was injected into the mold at a molding temperature of 200° C. and a mold temperature of 60° C. so as to fully pack the mold. Then, the molten resin was allowed to expand for 7.5 seconds without being applied with pressure and a expanded resin of a lower-expansion layer was cooled to solidify. Then, the cavity wall of the mold was retracted by 1.95 mm to enlarge the cavity capacity. Thus, the central portion of the resin with respect to the cavity thickness direction was allowed to expand. The expanded resin was cooled to solidify. Thus, a foamed article was obtained and then evaluated. The results are shown in Table 1.

Comparative Example 1

A molten thermoplastic resin containing a foaming agent was injected into a mold so as to fully pack the mold. A thermoplastic resin foamed article was obtained and then evaluated in the same manner as Example 1 except that the cavity wall of the mold was retracted by 1.95 mm in 0.5 second from the injection so as not to form a lower-expansion layer in the mold. The article had no lower-expansion layer and had a reduced rigidity in comparison to Example 1. The results are shown in Table 1.

TABLE 1

|  | Example 1 | Comparative Example 1 |
| --- | --- | --- |
| Total expansion ratio | 2.0 | 2.0 |
| Thickness (mm) |  |  |
| Skin layer | 0.3 | 0.2 |
| Lower-expansion layer | 0.2 | 0 |
| Higher-expansion layer | 3.0 | 3.6 |
| Porosity (%) |  |  |
| Lower-expansion layer | 15 |  |
| Higher-expansion layer | 65 | 56 |
| D1/D2 | 2.2 | 1.5 |
| Rigidity (N/cm) | 128 | 95 |

Example 2

As a thermoplastic resin, employed was a polypropylene resin obtained by mixing polypropylene AZ161C (manufactured by Sumitomo Mitsui Polyolefin Co., Ltd., MFR 30 g/10 min) and a long-chain-branching homopolypropylene "PF814" (manufactured by BASELL, MFR 2.2 g/10 min) in a ratio of 80/20. Expansion molding was carried out using an ES2550/400HL-MuCell (clamping force 400 ton) manufactured by ENGEL as an injection molding machine and a mold having a box-shaped molding section having dimensions of 290 mm by 370 mm, 45 mm in height and 2 mm in thickness (gate structure: bubble gate located in the central portion of a molded article) as shown in FIG. 4. As a foaming agent, supercritical nitrogen was used. It was supplied into the cylinder of the molding machine while being compressed to 20 MPa. The amount of the foaming agent supplied was 1.5%. A mixture of the thermoplastic resin and a foaming agent was injected into the mold at a molding temperature of 200° C. and a mold temperature of 60° C. so as to fully pack the mold. Then, the molten resin was allowed to expand for 7.5 seconds without being applied with pressure and a expanded resin of a lower-expansion layer was cooled to solidify. Then, the cavity wall of the mold was retracted by 1.95 mm to enlarge the cavity capacity. Thus, the central portion of the resin with respect to the cavity thickness direction was allowed to expand. The expanded resin was cooled to solidify. Thus, a foamed article was obtained and then evaluated. The results are shown in Table 2.

TABLE 2

|  | Example 2 |
| --- | --- |
| Total expansion ratio | 10 |
| Thickness (mm) |  |
| Skin layer | 0.3 |
| Lower-expansion layer | 0.2 |
| Higher-expansion layer | 18 |
| Da1/Da2 | 1.6 |
| Db1/Db2 | 6.5 |
| Cushion property | Good |
| Rigidity | Good |

What is claimed is:

1. A thermoplastic resin foamed article, wherein the foamed article has two opposite surfaces, wherein the foamed article has at least a skin layer which defines one of the opposite surfaces and has a porosity of 0% or more but less than 1%, a lower-expansion layer which has a porosity of not less than 1% but less than 40% and is arranged so as to be adjacent to the skin layer, and a higher-expansion layer which has a porosity of not less than 40% but less than 100% and is arranged so as to be adjacent to the lower-expansion layer, wherein the skin layer, the lower-expansion layer and the higher-expansion layer are made of the same thermoplastic resin, wherein the higher-expansion layer has therein cells, wherein cells located in a portion in the higher-expansion layer near the lower-expansion layer have a ratio of Da1 to Da2 of from 1 to 4 where Da1 denotes the length of the cells in the thickness direction of the higher-expansion layer and Da2 denotes the length of the cells in a direction perpendicular to the thickness direction, and wherein cells located in a central portion in the higher-expansion layer have a ratio of Db1 to Db2 of more than 4 but not more than 10, where Db1 denotes the length of the cells in the thickness direction of the higher-expansion layer and Db2 denotes the length of the cells in a direction perpendicular to the thickness direction.

2. The foamed article according to claim 1, wherein the thermoplastic resin is an olefin-based resin or an olefin-based thermoplastic elastomer.

3. The foamed article according to claim 1, wherein the foamed article is obtainable by a method comprising the steps: providing a mold having therein a cavity whose capacity is changeable, charging thermoplastic resin containing a foaming agent into a the cavity, holding the cavity to have a predetermined volume, thereby forming a skin layer having a porosity of 0% or more but less than 1% and a lower-expansion layer having a porosity of not less than 1% but less than 40%, enlarging the cavity to further expand a part of the lower-expansion layer, thereby forming a higher-expansion layer having a porosity of not less than 40% but less than 100%.

4. The foamed article according to claim 1, wherein the foaming agent is supercritical carbon dioxide, supercritical nitrogen or a supercritical mixture of carbon dioxide and nitrogen.

5. A laminate in which the foamed article according to claim 1 is integrally laminated on a substrate.

6. The laminate according to claim 5, wherein the foamed article has a covering material on its surface on which the substrate is not present.

7. A decorated foamed article comprising the foamed article according to claim 1 and a covering material integrally laminated on the foamed article.

* * * * *